Sept. 14, 1954 R. M. M. OBERMAN ET AL 2,689,300

ARRANGEMENT TO OBTAIN A VOLTAGE INTERVAL MULTIPLIER

Filed June 14, 1949 6 Sheets-Sheet 1

Inventors

Roelof M M Oberman and

Antonie Snyders

By Michael S Striker

ARRANGEMENT TO OBTAIN A VOLTAGE INTERVAL MULTIPLIER

Filed June 14, 1949

6 Sheets-Sheet 2

Inventors
Roelof M. M. Oberman and
Antonie Snijders
by Michael S. Striker
attorney

ARRANGEMENT TO OBTAIN A VOLTAGE INTERVAL MULTIPLIER

Filed June 14, 1949

Inventors
Roelof M. M. Oberman and
Antonie Snijders
By Michael S. Striker
Agt

Sept. 14, 1954 R. M. M. OBERMAN ET AL 2,689,300

ARRANGEMENT TO OBTAIN A VOLTAGE INTERVAL MULTIPLIER

Filed June 14, 1949 6 Sheets-Sheet 4

Inventors
Roelof M M Oberman and
Antonie Snijders
by Michael S Striker
atty

ARRANGEMENT TO OBTAIN A VOLTAGE INTERVAL MULTIPLIER

Filed June 14, 1949 6 Sheets-Sheet 5

Inventors
Roelof M M Oberman and
Antonie Snijders
by Michael S Striker
Agt

Inventor
Roelof M. M. Oberman and
Antonie Snijders
by [signature]
Agt

Patented Sept. 14, 1954

2,689,300

UNITED STATES PATENT OFFICE 2,689,300

ARRANGEMENT TO OBTAIN A VOLTAGE INTERVAL MULTIPLIER

Roelof M. M. Oberman and Antonie Snijders, The Hague, Netherlands

Application June 14, 1949, Serial No. 99,022

Claims priority, application Netherlands June 15, 1948

8 Claims. (Cl. 250—27)

The invention refers to a voltage interval multiplier. In such an arrangement a voltage varying between two values, when the voltage interval multiplier is $n$-fold, is converted into a proportional output voltage, which traverses $n$ tmes a certain interval of the output voltage in such a manner that the output voltage jumps back from the final value to the initial value or the reverse at the $$\frac{1}{n}, \frac{2}{n}, \ldots \frac{n-1}{n} \text{th}$$

part of the input voltage.

Such arrangements can be constructed of $m$ mutually equal switching units, each of which multiplies the interval $n$-fold, resulting in an $n^m$-fold multiplier.

An $n$-fold unit fundamentally contains $n$ tubes.

A special form of this arrangement is obtained for $n=2$. Then the arrangement according to the invention can be used as converter of linear codes into binary codes, like they are required for pulse code modulation systems. An arrangement working with normal tubes was already proposed. The arrangement according to the present invention has the advantage over the arrangement proposed at an earlier time that the circuit may be built up from equally designed elementary units and does not contain resistances which are traversed by currents of succeeding units. The arrangement according to the invention can be applied to tube-voltmeters in which the indicating instrument traverses $n$ times the scale from zero to the maximal value, if the input voltage varies in the prescribed interval, which may be called scale interval multiplying.

Figure 1:
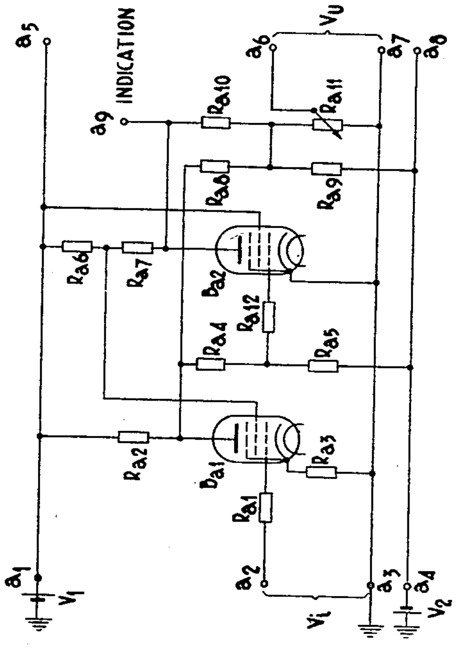
Figure 2:
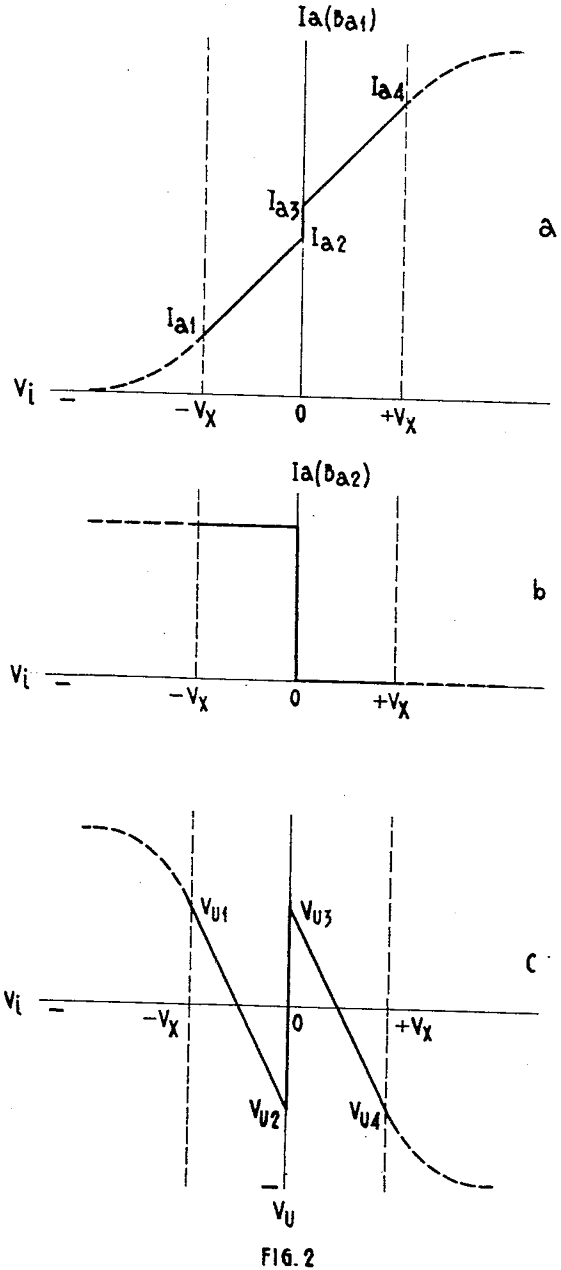
Figure 3:
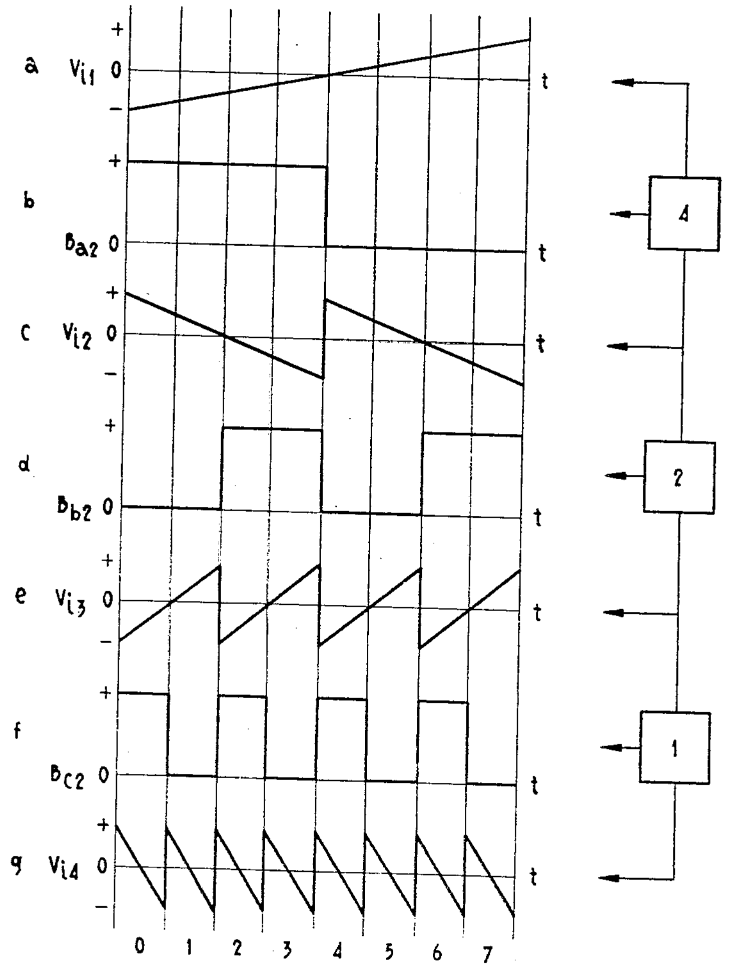
Figure 4:
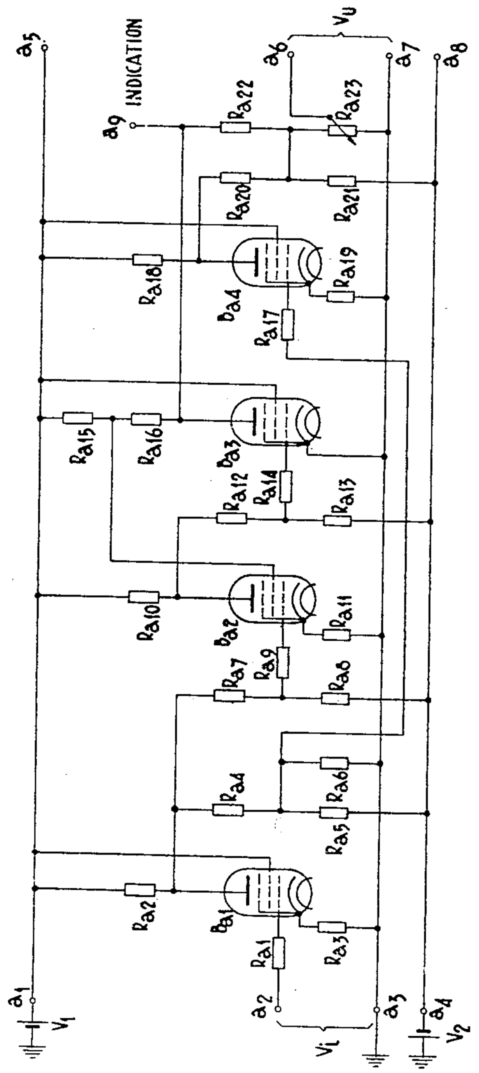
Figure 5:
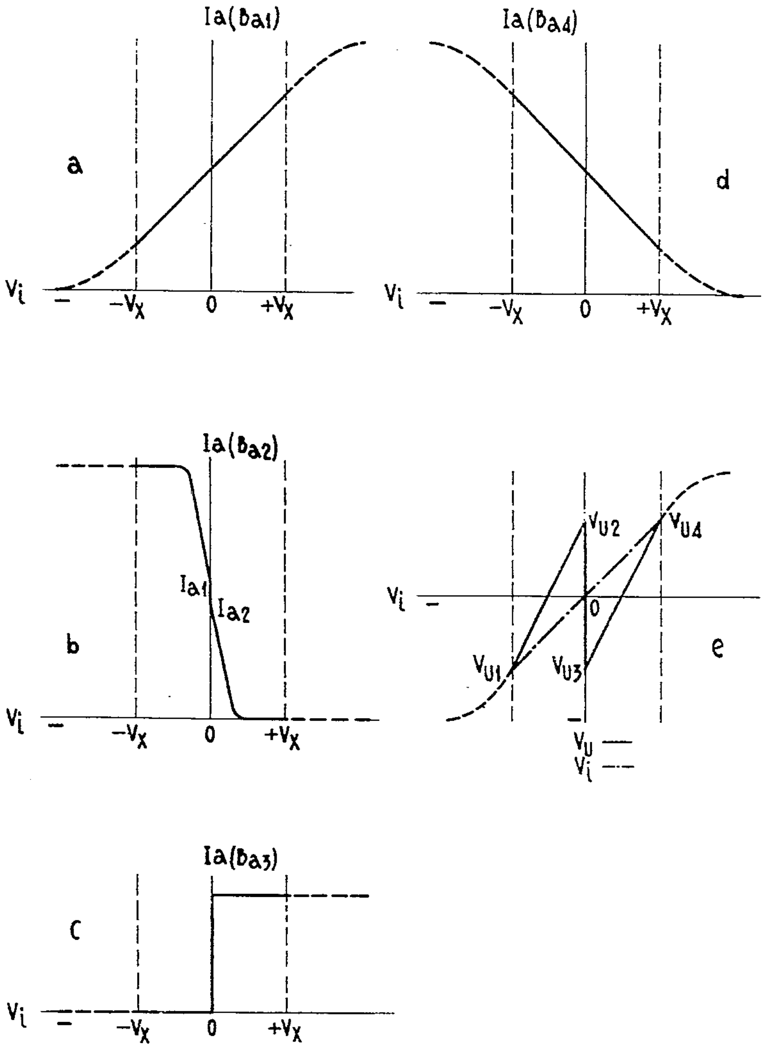
Figure 6:
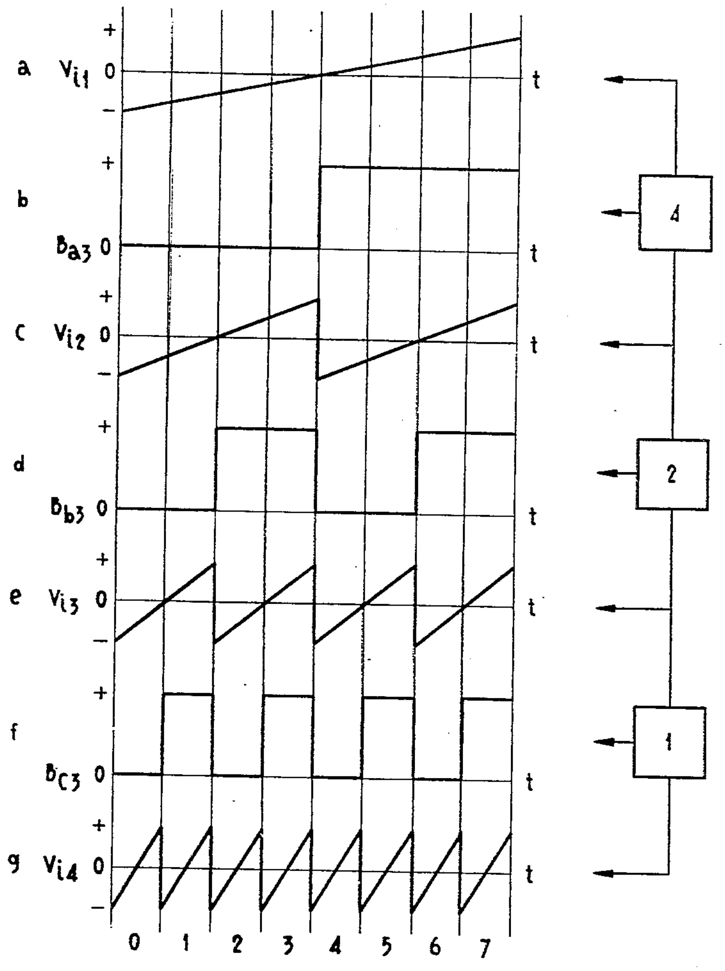

The invention will be elucidated by means of the following figures:

Fig. 1 represents the circuit arrangement;

Fig. 2 graphically shows the operation of the circuit arrangement according to Fig. 1;

Fig. 3 indicates the operation of a number of units according to the circuit arrangement of Fig. 1;

Fig. 4 shows a practical embodiment of a switching unit;

Fig. 5 gives the graphs belonging to the arrangement according to Fig. 4;

Fig. 6 elucidates the operation of a number of switching units according to Fig. 4.

The arrangement according to Fig. 1 contains an input tube $B_{a1}$ and an output tube $B_{a2}$. The input tube $B_{a1}$ is a normal amplifying tube coupled degeneratively with the cathode resistance $R_{a3}$ and which is connected via the anode resistance $R_{a2}$ to the positive pole of an anode voltage source $V_1$.

The cathode resistance $R_{a3}$ may be connected to earth.

The voltage to be coded is connected to the terminals $a_2$ and $a_3$. The terminal $a_2$ is connected via the protective resistance $R_{a1}$ to the control grid of the input tube $B_{a1}$.

The anode of the tube $B_{a1}$ is connected to the control grid of the output tube $B_{a2}$ via a potentiometer $R_{a4}/R_{a5}$ (which is connected to the negative pole of the auxiliary voltage source $V_2$) and the protective resistance $R_{a12}$.

The cathode of the output tube $B_{a2}$ is connected to earth, while the anode of this tube is connected to the positive pole of the anode voltage source via the resistances $R_{a6}$ and $R_{a7}$. The screen grid of the input tube $B_{a1}$ is connected to the coupling point of the resistances $R_{a6}$ and $R_{a7}$, resulting in a lightly tripping counteraction of the output tube $B_{a2}$ on the input tube $B_{a1}$. The anodes of the tubes $B_{a1}$ and $B_{a2}$ are connected jointly via the resistance $R_{a9}$ to the negative pole of the auxiliary voltage source $V_2$ via the resistances $R_{a8}$ and $R_{a10}$ respectively. The coupling point of these resistances can be used as output of the switching unit. To fix the output voltage with respect to the earth potential this coupling point is connected to earth via a relatively low resistance $R_{a11}$.

The output terminal $a_6$ is connected to an adjustable tap of this resistance, so that the output voltage can be easily adjusted to the required value.

The voltage on terminal $a_9$ can give an indication about the situation of the switching unit. A following switching unit with the input terminal $b_1$—$b_4$ can be connected to the output terminals $a_5$—$a_8$.

In Fig. 2*a* the course of the anode current of the tube $B_{a1}$ has been indicated as function of the input voltage $V_1$ of the arrangement, measured with respect to the earth potential (terminal $a_2$ with respect to terminal $a_3$).

The cathode resistance $R_{a3}$ of the tube $B_{a1}$ is so adjusted, that at an input voltage of $-V_x$ volts such a negative control grid voltage is present that the anode current of $I_{a1}$ *m*A flows.

An input voltage increasing to zero will give a course of the anode current in correspondence with the characteristic in Fig. 2*a* unto the point where the anode current has the value $I_{a2}$.

While traversing the indicated part of the tube characteristic of Fig. 2*a*, the tube $B_{2a}$ was conductive, as represented in Fig. 2b by the constant value of the anode current of the tube $B_{a2}$ as a function of the input voltage on terminal $a_2$ of the arrangement. At an input voltage of zero volts the tube $B_{a2}$ will suddenly become non-conductive and remain so if the input-voltage $V_i$ increases further to positive values. This has been indicated in Fig. 2b by a decrease at $V_i=0$ of the anode current of the tube $B_{a2}$ to zero.

Owing to the coupling of the screen grid of the tube $B_{a1}$ with the connecting point of the anode resistances $R_{a6}$ and $R_{a7}$ of the tube $B_{a2}$, the sudden cut-off of the tube $B_{a2}$ causes a sudden increase of the screen grid voltage, so that the anode current of the tube $B_{a1}$ increases to the value $I_{a3}$ (Fig. 2a). This is a tripping action between the tubes $B_{a1}$ and $B_{a2}$ which for the tube $B_{a2}$ is effected between the possible extremes of the conductive situation, this tripping action for the tube $B_{a1}$ taking place only over a small part of the anode current.

The output voltage $V_u$ at the point $a_6$ of the arrangement according to Fig. 1 as function of the input voltage $V_i$ is indicated in Fig. 2c.

If the input voltage $V_i$ becomes less negative the output voltage $V_u$ becomes less positive, whereby the arrangement according to this embodiment is so adjusted that with an input voltage of $-V_x$ volts an output voltage of $+V_{u1}$ volts is obtained. To enable a convenient intercoupling of equally adjusted switching units the latter is so chosen that $(V_x)=(V_{u1})$.

Further the adjustment is as follows. When $V_x=0$ volts, the tripping moment the output voltage $V_{u2}=-V_{u1}$ volts, after the tripping of the conductive position of the tubes $B_{a1}$ and $B_{a2}$ (which via the resistance $R_{a10}$ is expressed in the output voltage) changes into $+V_{u3}=+V_{u1}$ volts, becoming gradually more negative unto $$+V_x=-V_{u4}$$

volts when the input voltage $V_i$ increases to $+V_x$.

The gradual course of the output voltage $V_v$ is indicated by the anode of the tube $B_{a1}$ via the resistance $R_{a9}$, the jump in the output voltage is indicated by the anode of the tube $B_{a2}$ via the resistance $R_{a10}$.

By the insertion of a tube $B_{a3}$ in the arrangement according to Fig. 1, which is arranged entirely equal to $B_{a2}$, however, so adjusted that the tube $B_{a2}$ trips over at ⅓ of the input voltage and the tube $B_{a3}$ at ⅔ of the input voltage, a ternary element is obtained.

Fig. 3 shows the course of the conductive situation of the tube $B_2$ of 3 sequentially coupled switching elements according to Fig. 1; Fig. 3 also shows the course of the output c. q. input voltages of these switching units. The right hand part of this figure represents a block diagram of the coupling of the sequential units (marked 1, 2, 4 etc.).

The input voltage $V_{i1}$ of the first unit as function of the time has been shown as increasing linearly with a feeble slope from a previously determined maximal negative value to as great a positive value.

As long as the input voltage $V_i$ is negative, the tube $B_{a2}$ is non-conductive; as long as the input voltage $V_i$ is positive it is conductive. The output voltage of the first switching unit, at the same time the input voltage of the second unit, then twice (as already described for Fig. 1 and Fig. 2) traverses sawtooth-like a characteristic as represented in Fig. 3c, which characteristic is in counterphase with the one according to Fig. 3a.

The tube $B_{b2}$ is non-conductive as long as the input voltage of the unit is positive.

While the sawtooth-characteristic according to Fig. 3c is traversed, the conductive situation of the tube $B_{b2}$ is modified twice, an output voltage for the second unit being obtained, which means a doubling in frequency with respect to the one of the voltage of the input element, the two being in counterphase with each other. The third unit produces a frequency doubling of the input sawtooth voltage, so that at the output of the third unit a sawtooth voltage originates, having an eightfold frequency with respect to the frequency of the input voltage.

The described arrangment with sequentially coupled units can also be used to analyze a voltage in a binary code, as e. g. required pulse code modulation systems and electronic calculating machines. A device with 3 switching units according to Fig. 1 can convert an input voltage in 8 stages into a 3-unit code, as may be seen from the 8 vertical subdivisions of the Fig. 3a–Fig. 3g. The various voltage stages of the input voltage can be numbered 0–7. Then the coded binary combination can always be found by giving the value 1 to the tube $B_2$ of the last switching element (having an odd number), when the tube $B_2$ of this unit is non-conductive, furthermore the value 2 to the tube $B_2$ of the last switching element but one (being even) when the tube $B_2$ is conductive, furthermore the value 4 to the tube $B_2$ of the last switching element but two (having an even number) when the tube $B_2$ of that unit is non-conductive, etc.

On the seventh magnitude of input voltage the respective tubes $B_2$ of the sequential units from the latter then are non-conductive, conductive, and non-conductive, i. e. that the total value of this binary combination is $1+2+4=7$. The practical drawback of the arrangement according to Fig. 1 in the embodiment with two tubes is that the phase of the even- and odd-numbered units is different, which may easily give rise to errors when the adjusted code is determined, while in connection with the limited mutual conductance of the applied tubes there is a certain play in the tripping effect between the two tubes $B_1$ and $B_2$ that is not to be neglected with respect to the input voltage.

Owing to this phenomenon the number of elements that is to be switched sequentially, is restricted; as soon as the play is such that it corresponds with the input voltage of the whole arrangement necessary to make the last unit traverse the whole characteristic, the last unit is unreliable.

Both objections have been eliminated in the arrangement according to Fig. 4.

This arrangement contains 4 tubes, the first of which $B_{a1}$ acts as a degeneratively coupled amplifying tube to obtain a large grid swing, which tube for the rest, with the exception of the fixed grid screen voltage is arranged in the same manner as the tube of the same denomination in Fig. 1. The anode circuit of the tube is connected to the negative pole of the auxiliary voltage source $V_2$ via two potentiometers $R_{a4}/R_{a5}$ and $R_{a7}/R_{a8}$. The tap of the first mentioned potentiometer is connected to earth via the relatively low resistance $R_{a6}$, which means a fixation of this point, like this is necessary to control a phase-inverting tube $B_{a4}$ of which the control grid via the protective resistance $R_{17}$ has been coupled with this tapping point. The tapping point of the other potentiometer controls a tripping arrangement of the tubes $B_{a2}$ and $B_{a3}$, which in principle are arranged according to Fig. 1 and also operate in accordance with this figure, with the difference that owing to the presence of the input amplifying tube $B_{a1}$ the conductive situations of the tubes $B_{a2}$ and $B_{a3}$ are in counterphase with respect to the tubes with the corresponding function from Fig. 1. Therefore the resistances $R_{a9}$–$R_{a16}$ need no further explanation. The tube $B_{a4}$ is a phase-inverting tube generating a phase-inversion of the input voltage of the tube $B_{a2}$. The anode of the tubes $B_{a3}$ and $B_{a4}$ are in the same manner as those of the tubes $B_{a1}$ and $B_{a2}$ of the arrangement in accordance with Fig. 1 connected to the output potentiometer $R_{20}/R_{21}/R_{22}$ and $R_{23}$.

It may be remarked that the phase-inverting tube $B_{a4}$ is necesary and that it is impossible to make use of the tube $B_{a2}$ to obtain the required effect at the output of the relevant switching unit, because owing to the amplification of the input voltage the tube $B_{a2}$ in a very limited part of the input voltage traverses the whole characteristic. As a matter of fact this is necessary to obtain a play in the tripping effect between the tubes $B_{a2}$ and $B_{a3}$, which only forms a small part of the input voltage. The anode current characteristics of the various tubes as function of the input voltage of the arrangement and the output voltage as function of the input voltage have been indicated in the Fig. 5*a–e*.

Fig. 5*a* shows the anode current characteristic of the tube $B_{a1}$, which has a perfectly normal character. The input voltages necesary for the arrangement lie between $-V_x$ and $+V_x$. The characteristic of the phase-inverting tube $B_{a4}$ in Fig. 5*d* is perfectly the same as the one according to Fig. 5*a*, however, as image with respect to the $I_a$=axis. Fig. 5*b* shows the anode-current characteristic of the tube $B_{2a}$ which owing to the amplification has a much higher slope and is restricted to small field of the input voltage of the whole arrangement, with the particular feature that owing to the tripping action between the tubes $B_{a3}$ and $B_{a2}$ of the arrangement according to Fig. 4 at an input voltage $V_i=0$ there is a jump in the characteristic from $I_{a1}$ to $I_{a2}$ or the reverse. Simultaneously with this jump the tube $B_{a3}$ completely passes from the conductive to the non-conductive position or the reverse, as shown in Fig. 5*c*.

The output voltage $V_u$ of the arrangement, which is derived from the anode of the tube $B_{a4}$, measured at the point $_{a6}$, at an input voltage $-V_x$ has a value of $-V_{u1}$, which at a change of $V_i$ from $-V_x$ to 0, increase from $-V_{u1}$ to $+V_2=(V_{u1})$, to adopt after the tripping effect a value of $-V_{u3}=-V_{u1}$ and to increase from $-V_{u3}$ to $+V_{u4}=(V_{u3})$ when $V_i$ increases from 0 to $+V_x$. A doubling of the frequency of the sawtooth voltage takes place. A better insight in the operation of the switching unit is obtained by consideration of the dash-dot line in Fig. 5*e*, in which $V_i$ is indicated as function of $V_i$, i. e. as straight line under 45° owing to the origin of the axis system. The increase of the output voltage $V_u$ of a switching unit is twice as high as the one of the input voltage $V_i$. At $V_i=0$ the output voltage jumps back from the obtained final value to the initial value. When modern high slope tubes (type 18040) are used an input voltage range of 10 v. can be obtained and a play in the tripping point of less than $\frac{1}{100}$ v.

In this manner equal elements can be sequentially coupled as a larger whole, so that in the same manner as it was already the case for Fig. 1, there originates a sawtooth multi-vibrator or a device is obtained in which a linear voltage is converted into a linear code.

As can be seen from Fig. 6 which is analogous to Fig. 3 the output voltages of a unit are always in phase with the input voltages so that no difficulties can arise with the code positions to be read on the points 9 of the switching units. This type of arangement is remarkable for the fact that a voltage of a certain magnitude can suddenly be connected to the input of a series of switching units, whereby the adjusted binary code is always correct, without it being necessary for the units to have traversed all the changes of the conductive situation, like this would take place if the input voltage would be slowly increased unto the meant final value.

The arrangement according to Fig. 4 can be made *n*-partite if the anode of the input tube is connected to the negative pole of the auxiliary voltage source via *n* potentiometers. The tap of $n-1$ of these potentiometers should then be connected to the control grid of $n-1$ tubes $B_{a2}$, while the anodes of the necessary number of $n-1$ tubes $B_{a3}$ via individual resistances are connected to the output terminal of the arrangement.

So the arrangement of a tube unit still contains one input tube $B_{a1}$ and one tube $B_{a1}$. The $n-1$ arrangements of the tubes $B_{a2}/B_{a3}$ are so adjusted that their conductive situation trips at $$\frac{1}{n}, \frac{2}{n} \ldots \frac{n-1}{n}$$

of the input voltage. These units can be normally linked together to a greater series.

A remarkable embodiment of the arrangement can be found in tube-voltmeters. The indicator of the reading-instrument arranged in the anode circuit of a terminal tube connected according to Fig. 1 or 4 to the output of one or a series of switching units, will traverse the whole scale a number of times, a measuring equipment being obtained with $2^n$ linearly adapted scales, in which *n* represents the number of tube switching units. These scales pass into each other without switching over. This is called voltage interval multiplier or scale multiplier.

What I claim is:

1. Apparatus for varying an output voltage in a dependent relation to simultaneous variations of an input voltage, comprising in combination an anode current source having a positive terminal and a grounded negative terminal; an auxiliary current source having a negative terminal and a grounded positive terminal; an amplifying tube having a cathode, a control grid and an anode; a resistor degeneratively coupling said cathode of said amplifying tube to ground; means connected to said control grid of said amplifying tube and being adapted to be biased by the input voltage; a first resistor connecting said positive terminal of said anode current source with said anode of said amplifying tube; a first potentiometer including two series connected resistors inserted between said negative terminal of said auxiliary current source and the junction of said first resistor and said anode of said amplifying tube; a second potentiometer including two series-connected resistors inserted between said negative terminal of said auxiliary voltage source and the junction of said first resistor and said anode of said amplifying tube; a first tube having a cathode, a control grid, a screen grid and an anode; a resistor degeneratively coupling said cathode of said first tube to ground; means for connecting said control grid of said first tube to the junction of said two series-connected resistors of said second potentiometer so as to bias said control grid of said first tube with a voltage depending on the anode current of said amplifying tube; a second resistor inserted between said positive terminal of said anode current source and said anode of said first tube; a third potentiometer including two series-connected resistors inserted between said negative terminal of said auxiliary current source and the junction of said second resistor and said anode of said first tube; a second tube having a grounded cathode, a control grid, and an anode; means for connecting said control grid of said second tube to the junction of said two series-connected resistors of said third potentiometer so as to bias said control grid of said second tube in dependency on the anode current of said first tube; a fourth potentiometer including two series connected resistors inserted between said positive terminal of said anode current source and said anode of said second tube; means for connecting said screen grid of said first tube with the junction of said two series-connected resistors of said fourth potentiometer whereby said first tube is slightly tripped by the anode current of said second tube; a third tube having a cathode, a control grid and an anode; a resistor degeneratively coupling said cathode of said third tube to ground; means for connecting said control grid of said third tube to the junction of said two series-connected resistors of said first potentiometer whereby said third tube is rendered non-conductive in inverse relation to the current-conductive condition of said amplifying tube; a third resistor inserted between said positive terminal of said anode current source and said anode of said third tube; a fifth potentiometer including two series-connected resistors inserted between said negative terminal of said auxiliary current source and the junction of said third resistor and said anode of said third tube; a fourth resistor inserted between said anode of said second tube and the junction of said two series-connected resistors of said fifth potentiometer; and an output terminal connected to the junction of said two series-connected resistors of said fifth potentiometer, whereby an output voltage is derived between said output terminal and ground which passes twice through a predetermined output voltage interval when the input voltage passes once through a predetermined input voltage interval.

2. Apparatus for varying an output voltage in a dependent relation to simultaneous variations of an input voltage, comprising in combination an anode current source having a positive terminal and a grounded negative terminal; an auxiliary current source having a negative terminal and a grounded positive terminal; an amplifying tube having a cathode, a control grid and an anode; a resistor degeneratively coupling said cathode of said amplifying tube to ground; means connected to said control grid of said amplifying tube and being adapted to be biased by the input voltage; a first resistor connecting said positive terminal of said anode current source with said anode of said amplifying tube; a first potentiometer including two series-connected resistors inserted between said negative terminal of said auxiliary current source and the junction of said first resistor and said anode of said amplifying tube; a second potentiometer including two series-connected resistors inserted between said negative terminal of said auxiliary voltage source and the junction of said first resistor and said anode of said amplifying tube; a first tube having a cathode, a control grid, a screen grid and an anode; a resistor degeneratively coupling said cathode of said first tube to ground; means for connecting said control grid of said first tube to the junction of said two series-connected resistors of said second potentiometer so as to bias said control grid of said first tube with a voltage depending on the anode current of said amplifying tube; a second resistor inserted between said positive terminal of said anode current source and said anode of said first tube; a third potentiometer including two series-connected resistors inserted between said negative terminal of said auxiliary current source and the junction of said second resistor and said anode of said first tube; a second tube having a grounded cathode, a control grid, and an anode; means for connecting said control grid of said second tube to the junction of said two series-connected resistors of said third potentiometer so as to bias said control grid of said second tube in dependency on the anode current of said first tube; a fourth potentiometer including two series-connected resistors inserted between said positive terminal of said anode current source and said anode of said second tube; means for connecting said screen grid of said first tube with the junction of said two series-connected resistors of said fourth potentiometer whereby said first tube is slightly tripped by the anode current of said second tube; a third tube having a cathode, a control grid and an anode; a resistor degeneratively coupling said cathode of said third tube to ground; means for connecting said control grid of said third tube to the junction of said two series-connected resistors of said first potentiometer whereby said third tube is rendered non-conductive in inverse relation to the current-conductive condition of said amplifying tube; a third resistor inserted between said positive terminal of said anode current source and said anode of said third tube; a fifth potentiometer including two series-connected resistors inserted between said negative terminal of said auxiliary current source and the junction of said third resistor and said anode of said third tube; a fourth resistor inserted between said anode of said second tube and the junction of said two series-connected resistors of said fifth potentiometer; a low ohmic resistor inserted between the junction of said two series-connected resistors of said fifth potentiometer and ground; a variable tap arranged on said low ohmic resistor; and an output terminal connected to said tap of said low ohmic resistor whereby an output voltage is derived between said output terminal and ground which passes twice through a predetermined output voltage interval when the input voltage passes once through a predetermined voltage interval.

3. Apparatus for varying an output voltage in a dependent relation to simultaneous variations of an input voltage, comprising in combination, an anode current source having a positive terminal and a grounded negative terminal; an auxiliary current source having a negative terminal and a grounded positive terminal; an amplifying tube having a cathode, a control grid, a screen grid and an anode; a resistor degeneratively coupling said cathode of said amplifying tube to ground; means connected to said control grid of said amplifying tube and being adapted to be biased by the input voltage; a first resistor connecting said positive terminal of said anode current source with said anode of said amplifying tube; a first potentiometer including two series-connected resistors inserted between said negative terminal of said auxiliary current source and the junction of said first resistor and said anode of said amplifying tube; a second potentiometer including two series-connected resistors inserted between said negative terminal of said auxiliary voltage source and the junction of said first resistor and said anode of said amplifying tube; a first tube having a cathode, a control grid, a screen grid and an anode; a resistor degeneratively coupling said cathode of said first tube to ground; means for connecting said control grid of said first tube to the junction of said two series-connected resistors of said second potentiometer so as to bias said control grid of said first tube with a voltage depending on the anode current of said amplifying tube; a second resistor inserted between said positive terminal of said anode current source and said anode of said first tube; a third potentiometer including two series-connected resistors inserted between said negative terminal of said auxiliary current source and the junction of said second resistor and said anode of said first tube; a second tube having a grounded cathode, a control grid, a screen grid and an anode; means for connecting said control grid of said second tube to the junction of said two series-connected resistors of said third potentiometer so as to bias said control grid of said second tube in dependency on the anode current of said first tube; a fourth potentiometer including two series-connected resistors inserted between said positive terminal of said anode current source and said anode of said second tube; means for connecting said screen grid of said first tube with the junction of said two series-connected resistors of said fourth potentiometer whereby said first tube is slightly tripped by the anode current of said second tube; a third tube having a cathode, a control grid, a screen grid and an anode; a resistor degeneratively coupling said cathode of said third tube to ground; means for connecting said control grid of said third tube to the junction of said two series-connected resistors of said first potentiometer whereby said third tube is rendered non-conductive in inverse relation to the current-conductive condition of said amplifying tube; means for connecting said screen grids of said amplifying tube, said second tube and said third tube with said positive terminal of said anode current source; a third resistor inserted between said positive terminal of said anode current source and said anode of said third tube; a fifth potentiometer including two series-connected resistors inserted between said negative terminal of said auxiliary current source and the junction of said third resistor and said anode of said third tube; a fourth resistor inserted between said anode of said second tube and the junction of said two series-connected resistors of said fifth potentiometer; and an output terminal connected to the junction of said two series-connected resistors of said fifth potentiometer, whereby an output voltage is derived between said output terminal and ground which passes twice through a predetermined output voltage interval when the input voltage passes once through a predetermined input voltage interval.

4. Apparatus for varying an output voltage in a dependent relation to simultaneous variations of an input voltage, comprising in combination, an anode current source having a positive terminal and a grounded negative terminal; an auxiliary current source having a negative terminal and a grounded positive terminal; an amplifying tube having a cathode, a control grid, a screen grid and an anode; a resistor degeneratively coupling said cathode of said amplifying tube to ground; means connected to said control grid of said amplifying tube and being adapted to be biased by the input voltage; a first resistor connecting said positive terminal of said anode current source with said anode of said amplifying tube; a first potentiometer including two series-connected resistors inserted between said negative terminal of said auxiliary current source and the junction of said first resistor and said anode of said amplifying tube; a second potentiometer including two series-connected resistors inserted between said negative terminal of said auxiliary voltage source and the junction of said first resistor and said anode of said amplifying tube; a first tube having a cathode, a control grid, a screen grid and an anode; a resistor degeneratively coupling said cathode of said first tube to ground; means for connecting said control grid of said first tube to the junction of said two series-connected resistors of said second potentiometer so as to bias said control grid of said first tube with a voltage depending on the anode current of said amplifying tube; a second resistor inserted between said positive terminal of said anode current source and said anode of said first tube; a third potentiometer including two series-connected resistors inserted between said negative terminal of said auxiliary current source and the junction of said second resistor and said anode of said first tube; a second tube having a grounded cathode, a control grid, a screen grid and an anode; means for connecting said control grid of said second tube to the junction of said two series-connected resistors of said third potentiometer so as to bias said control grid of said second tube in dependency on the anode current of said first tube; a fourth potentiometer including two series-connected resistors inserted between said positive terminal of said anode current source and said anode of said second tube; means for connecting said screen grid of said first tube with the junction of said two series-connected resistors of said fourth potentiometer whereby said first tube is slightly tripped by the anode current of said second tube; a third tube having a cathode, a control grid, a screen grid and an anode; a resistor degeneratively coupling said cathode of said third tube to ground; means for connecting said control grid of said third tube to the junction of said two series-connected resistors of said first potentiometer whereby said third tube is rendered non-conductive in inverse relation to the current conductive condition of said amplifying tube; means for connecting said screen grids of said amplifying tube, said second tube and said third tube with said positive terminal of said anode current source; a third resistor inserted between said positive terminal of said anode current source and said anode of said third tube; a fifth potentiometer including two series-connected resistors inserted between said negative terminal of said auxiliary current source and the junction of said third resistor and said anode of said third tube; a fourth resistor inserted between said anode of said second tube and the junction of said two series-connected resistors of said fifth potentiometer; a low ohmic resistor inserted between the junction of said two series-connected resistors of said fifth potentiometer and ground; a variable tap arranged on said low ohmic resistor; and an output terminal connected to said tap of said low ohmic resistor whereby an output voltage is derived between said output terminal and ground which passes twice through a predetermined output voltage interval when the input voltage passes once through a predetermined voltage interval.

5. Apparatus for varying an output voltage in a dependent relation to simultaneous variations of an input voltage comprising, in combination, a pre-amplifier tube having an anode, and a control electrode adapted to be connected to a source of input voltage which may vary between predetermined lower and upper values; a first amplifier tube having a control electrode, a screen grid, and a plate; a first resistor coupling means electrically interconnecting the output of said pre-amplifier with said control electrode of said first amplifier tube; a differentiating tube having a control electrode and an anode; second resistor coupling means connected to the output of said first amplifier tube and being connected to the control electrode of said differentiating tube; biasing means connected to said second resistor coupling means to render said differentiating tube non-conductive when the ratio between an instantaneous value of said input voltage and said upper value of said input voltage is greater than one-half; an electrical connection electrically connected to said screen grid of first amplifier tube and to the anode of said differentiating tube for tripping said first amplifier tube when said differentiating tube is rendered non-conductive; a second amplifier tube having a control electrode and an anode; a third resistor coupling means interconnecting the output of said pre-amplifier tube with said control electrode of said second amplifier tube; two resistors each having one end and an opposite end, said one end being respectively connected to the anode of said differentiating tube and the anode of said second amplifier tube, and said opposite ends being connected to each other at a common junction; a first voltage source having a grounded positive terminal; a resistor interconnecting said first voltage source with said common junction; a second voltage source having its negative terminal grounded; a plurality of resistors connected at one end thereof to the positive terminal of said second voltage source and at the other ends thereof connected, respectively, to said anodes of said pre-amplifier, first amplifier, differentiating, and second amplifier tubes; and an output variable resistor grounded at one terminal thereof and connected at its other terminal to said common junction point to produce an output voltage whose variations have a fixed ratio to the variations of the input voltage connected to said pre-amplifier during variations of said input voltage between said lower and upper values thereof.

6. Apparatus for varying an output voltage in a dependent relation to simultaneous variations of an input voltage comprising, in combination, a pre-amplifier tube having an anode, and a control electrode adapted to be connected to a source of input voltage which may vary between predetermined lower and upper values; a first amplifier tube having a control electrode, a screen grid, and a plate; a first voltage source having a negative terminal and a grounded positive terminal; first resistor coupling means electrically interconnecting the output of said pre-amplifier tube with said control electrode of said pre-amplifier tube, said first resistor coupling means having one branch connected to said negative terminal of said first voltage source; a differentiating tube having a control electrode and an anode; second resistor coupling means connected to the output of said first amplifier tube and being connected to the control electrode of said differentiating tube; a biasing resistor, said biasing resistor being connected at one end thereof to said second resistor coupling means, and at the other end thereof connected to said negative terminal of said first voltage source to render said differentiating tube non-conductive when the ratio between said input voltage and said upper value of said input voltage is greater than one-half; an electrical connection electrically connected to said screen grid of said first amplifier tube and the anode of said differentiating tube for tripping said first amplifier tube when said differentiating tube is rendered non-conductive; a second amplifier tube having a control electrode and an anode; third resistor coupling means interconnecting the output of said pre-amplifier tube with said control electrode of said second amplifier tube; two resistors each having one end and an opposite end, said one end being respectively connected to the anode of said differentiating tube and the anode of said second amplifier tube, and said opposite ends being connected to each other at a common junction; a first voltage source having a grounded positive terminal; a resistor interconnecting said first voltage source with said common junction; a second voltage source having its negative terminal grounded; a plurality of resistors connected at one end thereof to the positive terminal of said second voltage source and at the other ends thereof connected, respectively, to said anodes of said pre-amplifier, first amplifier, differentiating, and second amplifier tubes; and an output variable resistor grounded at one terminal thereof and connected at its other terminal to said common junction point to produce an output voltage whose variations have a fixed ratio to the variations of the input voltage connected to said pre-amplifier during variations of said input voltage between said lower and upper values thereof.

7. Apparatus for varying an output voltage in a dependent relation to simultaneous variations of an input voltage comprising, in combination, an anode voltage source having a positive terminal and a grounded negative terminal; an auxiliary voltage source having a negative terminal and a grounded positive terminal; a pre-amplifier tube having a control electrode adapted to be connected to a source of input voltage which may vary between predetermined upper and lower values, said pre-amplifier tube also having an anode and a cathode; a resistor degeneratively coupling said cathode of said pre-amplifier tube to ground; a resistor connected to said control electrode of said pre-amplifier tube and being adapted to be biased by the input voltage; a resistor connecting said positive terminal of said anode voltage source with said anode of said pre-amplifier tube; a first amplifier tube having a control electrode, a screen grid, an anode and a grounded cathode; a resistor connecting said positive terminal of said anode voltage source with said anode of said first amplifier tube; first resistor coupling means having three branches, the first of said branches being connected to the negative terminal of said auxiliary voltage source, the second of said three branches being connected to said control electrode of said first amplifier tube, and the third of said three branches being connected to said anode of said pre-amplifier tube, said first, second, and third branches being connected to each other at a common junction; a differentiating tube having a control electrode and an anode, said anode of said differentiating tube being electrically connected to said positive terminal of said anode voltage source; second resistor coupling means, said second resistor coupling means having three branches, the first of said three branches being connected to said control grid of said differentiating tube, the second of said three branches being connected to said anode of said first amplifier tube, and the third of said three branches being connected to the negative terminal of said auxiliary voltage source, said first, second and third branches being connected to each other at a common junction so that said three branches of said resistor coupling means serve to suitably bias said differentiating tube, to render said differentiating tube non-conductive when the ratio between said input voltage and said upper value of said input voltage is greater than one-half; an electrical connection electrically connected to said screen grid of said first amplifier tube and the anode of said differentiating tube for tripping said first amplifier tube when said differentiating tube is rendered non-conductive; a second amplifier tube having a control electrode and an anode; a resistor connecting said positive terminal of said anode voltage source with said anode of said second amplifier tube; third resistor coupling means having four branches, the first of said four branches being connected to said control electrode of said second amplifier tube, the second of said four branches being connected to the anode of said pre-amplifier tube, the third of said four branches being connected to the negative terminal of said auxiliary voltage source, and the fourth of said branches being connected to ground, said first, second, third, and fourth branches being connected to each other at a common junction; two resistors each having one end and an opposite end, said one end being respectively connected to the anode of said differentiating tube and the anode of said second amplifier tube, and said opposite ends being connected to each other at a common junction; a resistor interconnecting said auxiliary voltage source with said last-mentioned common junction point; and an output variable resistor grounded at one end thereof and connected at its other terminal to said last-mentioned common junction point to produce an output voltage whose variations have a fixed ratio to the variations of the input voltage connected to said pre-amplifier during variations of said input voltage between said lower and upper values thereof.

8. An apparatus for varying an output voltage in a dependent relation to simultaneous variations of an input voltage, comprising, in combination, amplifier tube means having control, screen grid, aid output electrode means; at least one differentiating tube having a control electrode and an anode; resistor coupling means electrically interconnecting the output of said amplifier tube means with said control electrode of said differentiating tube; at least one electrical connection connecting said screen grid electrode means of said amplifier tube means and said anode of said differentiating tube for tripping said amplifier tube means when said differentiating tube is rendered non-conductive at said predetermined level of input voltage; at least one resistor having one end and an opposite end, said one end being connected to the anode of said differentiating tube; a source of direct current voltage; means for connecting to said amplifier tube means and to said differentiating tube said source of voltage; and an output variable resistor grounded at one terminal thereof and connected at its other terminal to said opposite end of said resistor, said output of said amplifier tube means being connected to the junction of said output variable resistor and said opposite end of said resistor to produce an output voltage whose variations have a fixed ratio to the variations of the input voltage connected to said amplifier tube means during variations of said input voltage between said lower and upper values thereof.

References Cited in the file of this patent

UNITED STATES PATENTS

| Number | Name | Date |
|---|---|---|
| 2,244,369 | Martin | June 3, 1941 |
| 2,352,455 | Summerhayes | June 27, 1944 |
| 2,426,216 | Hight | Aug. 26, 1947 |
| 2,488,297 | Lacy | Nov. 15, 1949 |
| 2,482,974 | Gordon | Sept. 27, 1949 |
| 2,493,648 | Walton et al. | Jan. 3, 1950 |

FOREIGN PATENTS

| Number | Country | Date |
|---|---|---|
| 600,205 | Great Britain | Apr. 2, 1948 |